INVENTOR.
Isidore Leo Friedlaender
BY
S. S. Thomas
ATTORNEY.

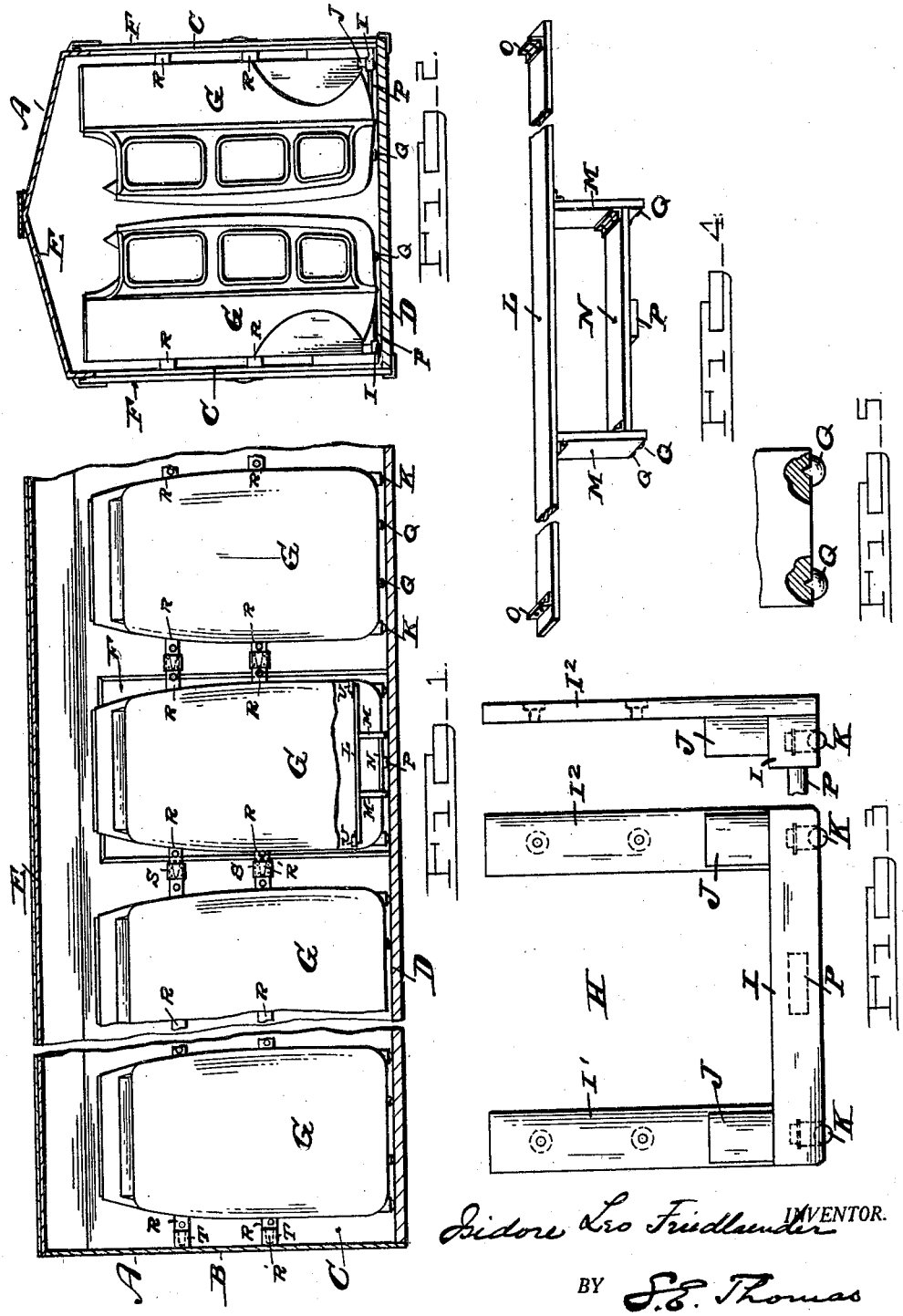

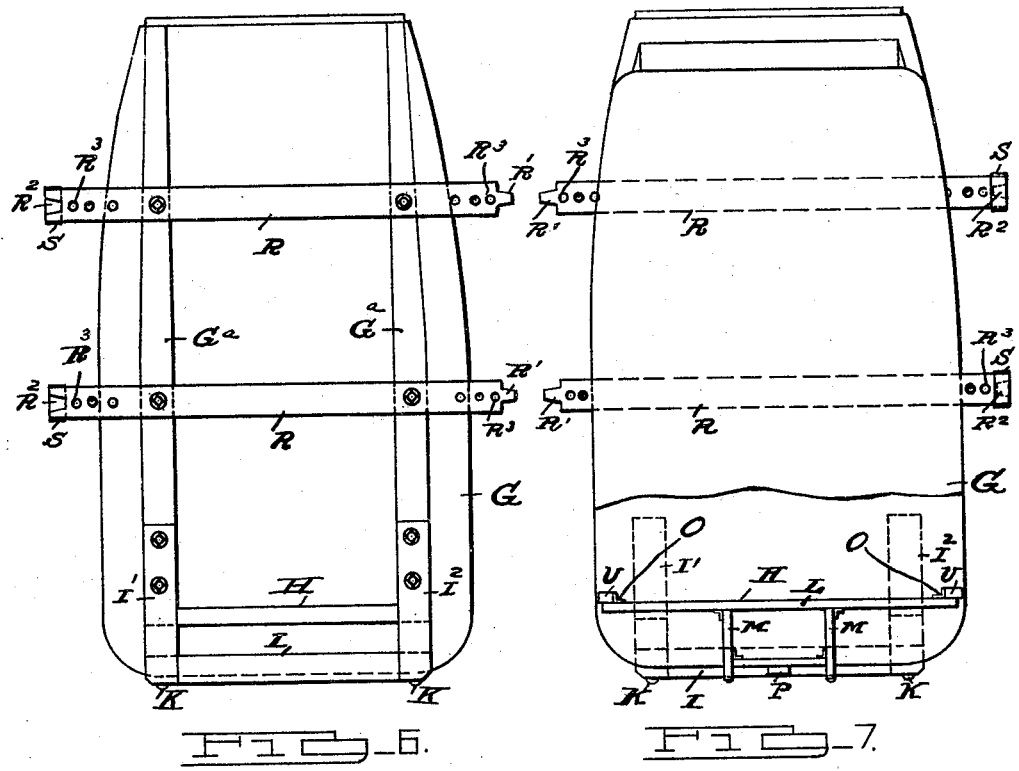
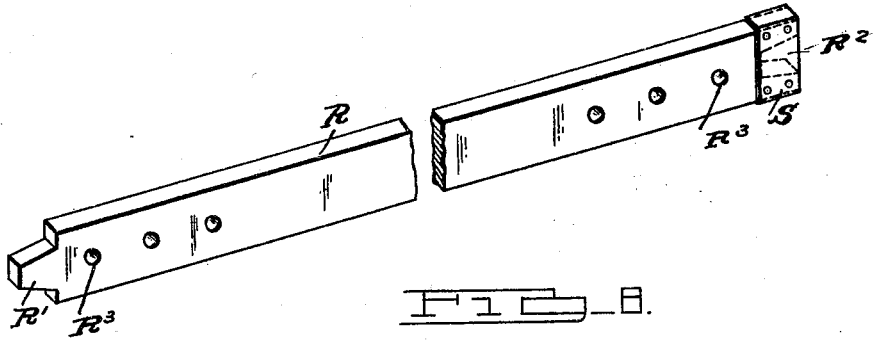
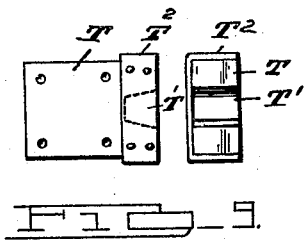

Patented Jan. 13, 1931

1,788,667

UNITED STATES PATENT OFFICE

ISIDORE LEO FRIEDLAENDER, OF DETROIT, MICHIGAN

MEANS FOR SHIPPING AUTOMOBILE BODIES

Application filed May 29, 1930. Serial No. 457,147.

My invention relates to means for the shipment of automobile bodies in freight cars, whereby a maximum number of car bodies may be accommodated in the car and readily secured against damage resulting from movement of the car in transit.

Heretofore car bodies have been supported in a horizontal position, one above the other in freight cars, the lower tier being attached to the floor of the car, while the upper tiers are secured to a suitable platform or other horizontal supporting means suspended from the side walls of the freight car. This method was practicable in the shipment of touring bodies before mounting the top thereon but with the advent of "closed" automobile bodies, freight cars have not sufficient height to accommodate "closed" bodies placed one above the other.

A horizontal disposal of the automobile bodies in a freight car precludes the shipment of a large number of bodies in the space provided, it also necessitates lifting the superposed touring bodies into position, often resulting in serious injuries to the workmen so engaged and damage to the bodies handled.

One of the primary objects of this invention is to provide means whereby automobile bodies may be attached to the side walls of the freight car in adjacent relation to each other and in such manner that substantially the entire space of the freight car may be utilized.

A further object of this invention is to provide means whereby the floor sills of automobile bodies may be secured to the side walls of a freight car;—the bodies resting on their rear end in suitable cradles secured to the sills of the body, that they may be readily moved into position for attachment to the side walls of the car or transported to and from the car door opening when loading or unloading,—the bodies if desired remaining in the cradle at the storage house until shipped, thereby reducing storage space and manual effort necessary to move same.

In the proposed method of shipping, the cradle is fitted with castors and skid domes to facilitate its movement over the car floor by the workmen loading the car,—the body being raised from the floor by the cradle and is thus insured against injury through contact with the floor.

A further object of this invention is to provide means whereby the bodies may be attached to the side walls in close relation to each other. Skid members having tongue and groove interlocking ends, are bolted transversely to the sills of the automobile before loading upon the freight car. Beginning at one end of the freight car, the skids bolted to the first body placed in position are interlocked with relatively short complementary interlocking blocks secured to the side wall at the end of the freight car, and thereafter the ends of each skid member are caused to interlock with the end of the abutting skid members secured to the adjacent automobile body, thus the skids attached to the several bodies cooperate to hold the bodies in position against the side walls of the car.

A further object of this invention is the great saving in lumber over other methods employing braces, cross pieces, etc. when shipping bodies in a horizontal or inclined position, and the loss due to wastage or abandoned material.

The cradles of the present method may be used again and again, either to move the bodies while in a warehouse or for moving them into position adjacent the side walls of the freight car, or to the car door when released from the wall.

So also they may be returned "knocked down" to the shipper for further shipments as required.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 indicates diagrammatically a fragmentary longitudinal sectional view through a freight car, showing a plurality of automobile bodies secured to its side walls.

Figure 2 is a diagrammatic cross-sectional view of the freight car showing two automobile bodies attached respectively to the opposite walls of the car.

Figure 3 indicates a front and side elevation of a body supporting cradle for attachment to the sills of an automobile body.

Figure 4 is a perspective view with parts broken away of the front end of a cradle for supporting a closed top automobile body.

Figure 5 is a fragmentary view showing a skid dome attached to the leg supporting portion of the cradle, shown in Figure 4.

Figure 6 is an inverted view of an automobile body, showing transverse interlocking skid members attached to its sills for engagement to the side walls of the freight car, also the rear end of the cradle attached to the sills of the body to receive and support the latter.

Figure 7 is an elevation of an automobile body looking toward its top, with parts broken away to show the front end of the supporting cradle, the legs of which extend through the rear window opening of the automobile body.

Figure 8 is a perspective view of one of the skids attached to the sills of the automobile body for securing the body to the side walls of a freight car having interlocking ends for engagement with the ends of like adjacent skid bars.

Figure 9 is a front and end elevation of a short block secured to the wall of the freight car at its ends to receive the interlocking end of the skid bars secured to the sills of the automobile body.

Referring now to the letters of reference placed upon the drawings:

A denotes a freight car, B one of its end walls; C, C the side walls; D the floor; E the roof; and F, F the usual sliding doors.

G, G denote a plurality of automobile bodies resting upon their rear end in a cradle secured to the sills of the automobile body;—the bodies being secured to the side walls of the car by means which will now be described in detail.

H denotes the cradle as a whole, the rear end being of U-shaped form, as disclosed in Figure 3.

I denotes a horizontal member of the cradle fitted at each end with upright members $I^1$, $I^2$ bolted or otherwise secured to the sills of the automobile body.

Figure 10:
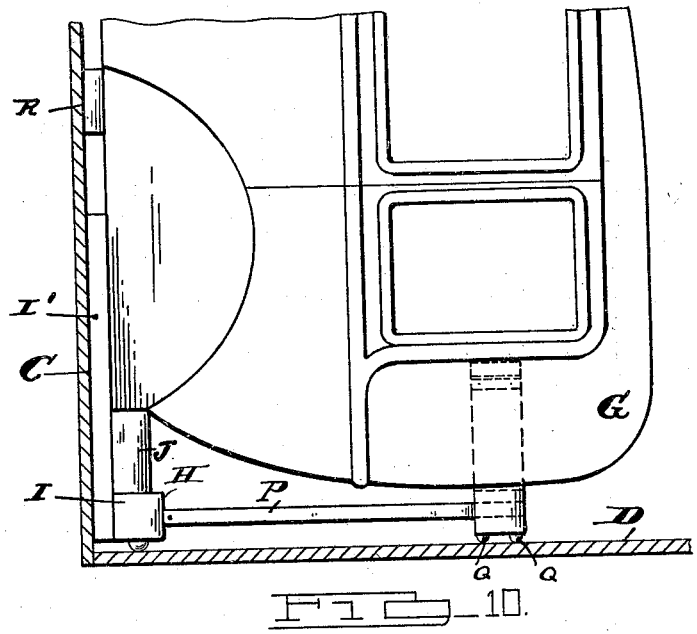
Figure 10 is a fragmentary cross-sectional view through a freight car showing a portion of an automobile body resting upon the cradle, adapted to receive and support the body and its closed top while in transit, secured to the side walls of the freight car.

J, J are blocks, secured to the horizontal member I and respectively to the upright members $I^1$, $I^2$;—upon which rests the end of the body, as indicated in Figure 10.

K, K are castors, preferably ball castors, supported in the horizontal member I, adjacent its ends.

L denotes a horizontal member, see Figure 4, secured by angle irons or other suitable means to a pair of upright legs or members M, M.

Between the legs M, M and secured thereto by angle plates or other suitable means is a second horizontal member N, which serves to hold the legs in fixed relation and against collapsing.

Secured adjacent the ends of the horizontal member L are angle irons O, O.

P is a connecting bar secured to the member N and to the member I to couple said parts together as a unit.

Q, Q are skid domes secured to the under edge of the upright members M, M.

R, R denote a pair of skid members, bolted transversely across the sills $G^a$ of the automobile body, as clearly indicated in Figures 6 and 7. The ends of each skid member are respectively formed with a tapering tongue $R^1$, and groove $R^2$, adapted to coordinate with the tongues and grooves of adjacent interlocking skid members.

S denotes a plate secured to the notched end of the skid member and overlapping the side of said notched portion to secure the tongue of the adjacent skid member in the groove that it may not be accidentally disconnected therefrom when interlocked.

T denotes a relatively short block provided at one end with a tapering notch $T^1$ and an overlapping plate $T^2$;—attached to the side wall of the freight car adjacent one end thereof to receive the tongue of the skid members bolted to the sills of the body loaded first upon the freight car.

Similar blocks (not shown) having a tapering tongue are also provided that they may be fitted to the tapering groove of the skid members attached to the sills of the automobile at the opposite end of the row of bodies loaded upon the freight car to secure the body against the car wall.

$R^3$, $R^3$ are bolt holes at each end of the skid members for attaching the same to the side walls of the car.

To mount an automobile body in the cradle H, the body is tipped on its rear end, the end of the body sills resting upon the blocks J, J of the cradle. The upright members $I^1$, $I^2$ of the cradle are then bolted to the sills $G^a$, $G^a$ of the automobile body. The horizontal member L is then inserted inside of the body with its legs or upright members M, M extending through the rear window opening.

Figure 11:
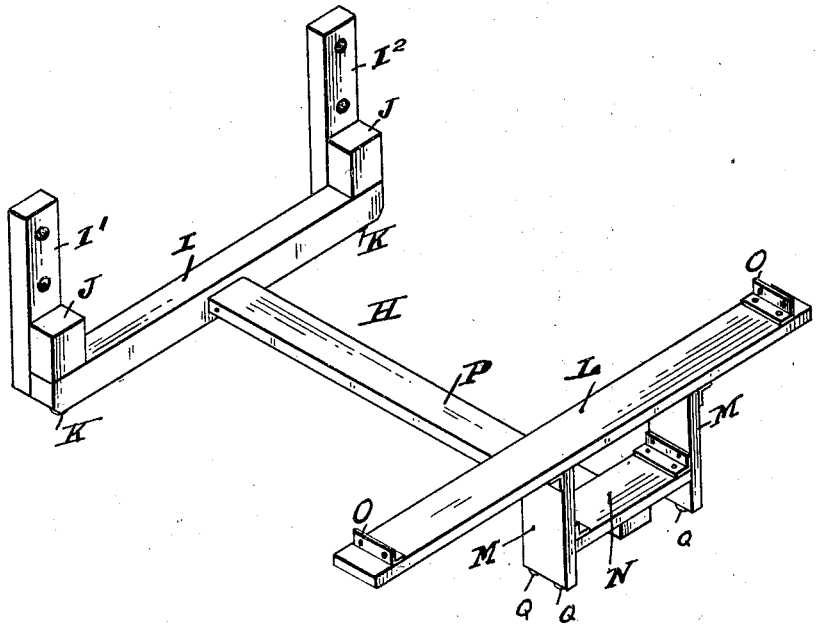
Figure 11 is a perspective view of the cradle shown in the preceding and other views.

A connecting bar P is then fastened to the member N and nailed or otherwise secured to the horizontal member I of the U-shaped portion of the cradle, see Figures 10 and 11. The casing member U, of the side windows of the automobile body rests upon the horizontal member L of the cradle, supporting the upper part of the body with the angle plates O, O bearing against and secured to the casing member U, to insure against lateral movement.

The automobile body having been properly mounted in the cradle, it may be wheeled on end upon the castors K, K and skid domes Q, Q in position adjacent to the side wall, near the end of the car.

Attached to the side wall of the car, adjacent its end wall is the receiving block T; see Figure 9. The automobile body is pushed parallel with the side wall of the car toward the receiving block T until the ends of the skid members R interlock with the blocks T, the overlapping plates T² serving to insure the interlocking parts against dislodgement.

The ends of the skid members are then bolted to the side walls of the car.

A second automobile body is now wheeled into position adjacent the side of the first body and the skid members of the respective bodies caused to interlock as before, the skid members being then bolted to the side wall of the freight car as previously explained. This is repeated from each end on both sides of the car until the central door openings are reached, whereupon a block T, provided either with a notch or projecting tongue as may be required, is secured to the wall of the car to receive the tongue or groove of the adjoining skid member;—the keeper plates S—T² overlapping the notches serving to prevent displacement of the tongue from the corresponding groove of the adjacent member. A final pair of automobile bodies are then secured in position in front of the door openings into the freight car—the skid members being secured to the door frame at each side of the opening.

The entire available space of the freight car is now occupied and it will be readily seen that the bodies may be shifted and secured in position for shipment with a minimum expenditure of manual effort on the part of workmen loading the freight car.

Having thus described my invention, what I claim is:

1. In combination with a freight car; means for shipping automobile bodies comprising a cradle to receive the rear end of an automobile body, adapted to support the body free from the floor and in a vertical position adjacent to and parallel with the walls of the freight car; and means for securing the body in a vertical position parallel with the walls of the freight car.

2. In combination with a freight car; means for shipping automobile bodies, comprising a cradle adapted to receive the rear end of an automobile body and to support the body in a vertical position adjacent to and parallel with the walls of the freight car; a plurality of skid members attached transversely to the sills of the automobile body having interlocking ends, adapted to coordinate with the interlocking ends of like skid members attached to the sills of an adjacent automobile body, whereby said bodies may be located in relatively close relation to each other and parallel with the vertical walls of the freight car; and means for securing said skid members to said walls.

3. A structure as specified in claim 2 in combination with anti-friction means secured to said cradle, whereby said cradle with the automobile body supported therein may be readily moved over the floor with a minimum expenditure of effort.

4. In combination with a freight car, means for shipping automobile bodies; comprising a cradle including a frame-work consisting of a pair of upright members adapted to be bolted to the sills of an automobile body; a transverse horizontal member secured to the lower end of said upright members, supporting blocks secured to the horizontal and upright members to receive the end of the body, a horizontal member located within the inclosed body, fitted with legs spaced apart and adapted to extend through a window opening at the rear end of said body; a member connecting said legs together; a longitudinally extending member secured to said last named member and to the transverse horizontal member attached to the upright members of the cradle frame; and a plurality of castors and skid domes secured to the cradle frame-work, whereby the body may be readily moved for loading, or when in storage.

5. A structure as specified in claim 4, in combination with a plurality of skid members bolted transversely to the sills of the automobile body, said transverse skid members having ends adapted to interlock with the ends of like transverse skid members bolted to the sills of an adjacent automobile body; and means for securing said skid members to the wall of the freight car.

6. A structure as specified in claim 4, in combination with a plurality of transverse skid members bolted to the sills of the automobile body, the ends of said skid members being respectively formed at the ends with a tongue and a groove adapted to interlock with the tongues and grooves of like transverse skid members, bolted to the sills of an adjacent automobile body; a plate secured to one end of the transverse skid member and overlapping the side of the groove, whereby the tongue of the interlocking skid member may be held against dislodgement from the groove; and means for securing the skid members to the walls of the freight car.

7. A structure as specified in claim 4, in combination with means secured to and adjacent the ends of the horizontal member,—located within the body of the automobile,—and bearing upon and secured to the window casings of the body, to assist in supporting the top of said body.

8. A structure as specified in claim 4, in combination with an angle iron secured to and adjacent the ends of the horizontal member,—located within the body of the automobile,—and bearing upon and secured to the window casings of the body, to assist in supporting the top of said body.

9. A structure as specified in claim 2 in combination with members adapted to be secured to the wall of the freight car adjacent the end walls and door openings of the latter, provided with an interlocking portion adapted to receive the interlocking end of the skid members, attached transversely to the sills of the body adjacent thereto.

In testimony whereof, I sign this specification.

ISIDORE LEO FRIEDLAENDER.